United States Patent
Greivenkamp, Jr. et al.

(10) Patent No.: US 6,341,181 B1
(45) Date of Patent: Jan. 22, 2002

(54) MID-SPATIAL FREQUENCY DIGITAL BOOST FILTER

(75) Inventors: John E. Greivenkamp, Jr., Tuscon, AZ (US); Andrew E. Lowman, La Crescenta, CA (US)

(73) Assignee: Canadian Space Agency, Saint-Hubert (CA)

( * ) Notice: Subject to any disclaimer, the term of this patent is extended or adjusted under 35 U.S.C. 154(b) by 0 days.

(21) Appl. No.: 09/130,473

(22) Filed: Aug. 7, 1998

(51) Int. Cl.$^7$ .............................................. H04N 7/133
(52) U.S. Cl. ...................................... 382/260; 702/190
(58) Field of Search ..................... 382/260, 261–265; 348/665–670; 702/190–191, 197; 708/300–301, 306, 315, 322–323

(56) References Cited

U.S. PATENT DOCUMENTS

| | | | | |
|---|---|---|---|---|
| 5,325,125 A | * | 6/1994 | Naimpally et al. | 348/402 |
| 5,329,317 A | * | 7/1994 | Naimpally et al. | 348/620 |
| 5,563,662 A | * | 10/1996 | Kishi | 348/240 |
| 6,035,065 A | * | 3/2000 | Kobayashi et al. | 382/201 |

* cited by examiner

*Primary Examiner*—Thomas D. Lee
*Assistant Examiner*—Stephen Brinich
(74) *Attorney, Agent, or Firm*—Nawrocki, Rooney & Siverston, P.A.

(57) ABSTRACT

A finite impulse response digital filter is designed for boosting mid-spatial frequencies as opposed to the frequencies near the sensor resolution limit. The digital filter's boost is centered on frequencies at about half the Nyquist frequency. To prevent over-boosting or enhancement of noise, the detail signal can be run through a coring filter to remove any low amplitude detail signal that resulted from noise.

9 Claims, 3 Drawing Sheets

MID-SPATIAL FREQUENCY DIGITAL BOOST FILTER

BACKGROUND OF THE INVENTION

Field of the Invention

The present invention relates to a finite impulse response (referred to hereinafter as FIR) digital filter device, and particularly to a FIR digital filter for use in boosting mid-spatial frequencies as opposed to the frequencies near the sensor resolution limit.

BACKGROUND OF THE INVENTION

It is common in video systems to provide a digital enhancement filter in the electronics in order to improve the resolution or sharpness of the final image. This filter is usually implemented as a FIR filter and operates on the green signal after it has been interpolated. The green channel is usually the only colour that is enhanced, since most of the video detail signal is derived from this channel. One- and two-dimensional versions are available, the two-dimensional filters acting only on an individual field of the sensor.

Filters are generally designed to boost the high-spatial frequencies in the image. These frequencies are near the Nyquist frequency of the sensor, which equals ½x, where $x_s$ is the horizontal pixel spacing. The process operates on the interpolated G signal from one, three or more lines or rows of pixels. The filtering is done on the intensity signals rather than the log intensity signals. In the case of a one-dimensional filtering process, a one-dimensional FIR filter is applied to the video signal through pixel delays and adds to provide a horizontal detail signal at each pixel:

−1 2 −1

The summation of these values is zero so that the filter has no response to low frequency or constant scenes. The separation of these filter entries is one pixel. This horizontal signal is added to the original video signal to improve the image sharpness. The amount of the boost can be varied by changing the relative amount of detail signal that is added to the original signal.

In some applications it is important that the sharpness or modulation of the mid-spatial frequencies be enhanced instead of the spatial frequencies near the Nyquist resolution limit. In these cases, the above boost filter is ineffective and may actually serve to enhance the noise in the image. This situation is especially true if the video signal shows column-to-column variations as are often seen on colour systems with green checkerboard colour filter array patterns. Looking at the existing boost filter, the detail signal is derived from pixel-to-pixel variations and these would tend to correspond to spatial frequencies that are near the Nyquist frequency.

From the foregoing it may be appreciated that a need has arisen for a FIR digital filter which improves the modulation of the image from a video sensor at lower spatial frequencies.

SUMMARY OF THE INVENTION

An object of the present invention is to provide a digital FIR filter designed to boost mid-spatial frequencies.

Another object of the present invention is to provide a digital FIR filter designed to enhance the sharpness or modulation of the spatial frequencies at about half the Nyquist frequency.

In accordance with one aspect of the present invention, there is provided a finite impulse response digital filter device for processing an input signal and improving detail components of an image signal, the device being part of a signal processing network, said device comprising:

(a) digital filter means for digital filtering the input signal so as to provide a boost signal; and (b) circuit means for adding the boost signal to the input signal so as to improve the sharpness or modulation of the mid-spatial frequencies of the image signal coming from a video sensor.

The present invention therefore provides for a digital FIR filter designed to improve the sharpness or modulation of the mid-spatial frequencies in the video signal and in the resulting image. The preferred implementation of this invention utilizes a FIR filter that operates on every other pixel, thus providing an easy to implement device.

Further objects and advantages of the present invention will he apparent from the following description, reference being made to the accompanying drawings wherein preferred embodiments of the invention are clearly shown.

BRIEF DESCRIPTION OF THE DRAWINGS

The present invention will be further understood from the following description with reference to the drawings in which.

DETAILED DESCRIPTION OF THE INVENTION

Although the details hereinafter disclosed are in connection with a video system, the invention is not necessarily limited to this, or any mode of image capture and could be incorporated in image processing systems (signal processing network) without regard to the source of the image signals. Elements of the video system omitted or not shown in detail may readily be selected from like elements known in the art.

Figure 1:
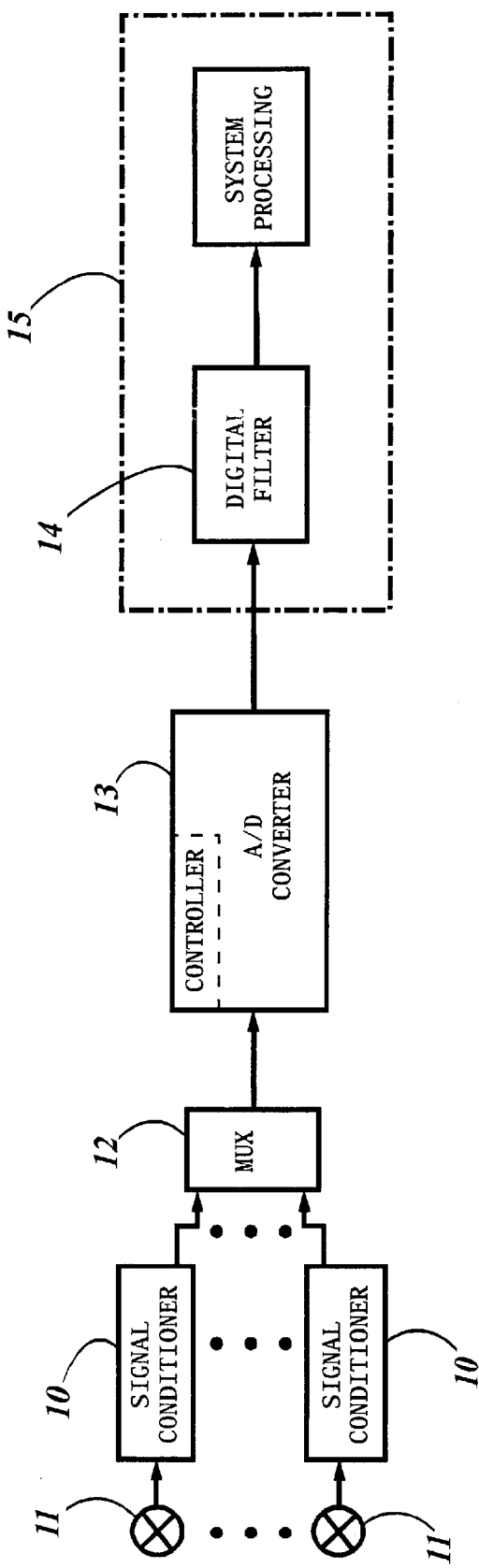
FIG. 1 is a block diagram of a circuit for realizing a FIR filter according to the present invention.

FIG. 1 is a schematic block diagram showing an embodiment of the present invention. A signal conditioner 10 receives a signal from a sensor 11. There can be a number of sensors II and signal conditioners 10, each comprising a channel. If there are a number of channels, then typically a multiplexer 12 time multiplexes the channel inputs which are then converted to digital form in an A/D converter 13 and then applied to a digital filter 14. A simple counter/decoder (not illustrated) can also provide the multiplexer 12 with a selection signal to route a desired channel input to the A/D converter 13. Alternatively, a processor 15 could provide the multiplexer 12 with the appropriate selection signal.

In accordance with the present invention, the A/D converter 13 receives an input signal then processes it through to the digital filter 14 in order to boost the mid-spatial frequencies. It should also be recognized that the input signal need not necessarily be supplied by a signal conditioner 10 or multiplexer 12 as illustrated in FIG. 1

In order to create a filter whose boost is centered on spatial frequencies at about half the Nyquist frequency, the frequency response of a simple horizontal detail filter will be modelled as a rectangular band pass.

Figure 2:
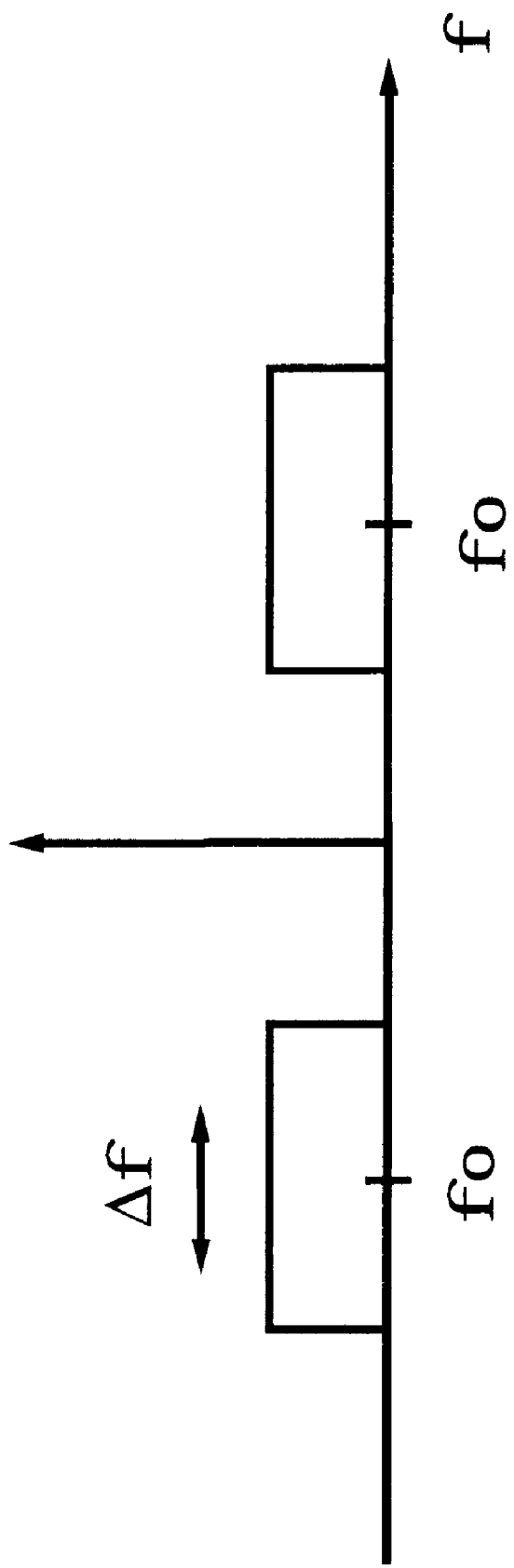
FIG. 2 is a diagram schematically illustrating the frequency response of a one-dimensional boost filter centered at $f_o$.

FIG. 2 is a diagram schematically illustrating the frequency response of a one-dimensional boost filter centered at $f_o$. This function can be written as (ignoring constants of proportionality throughout):

Detail Filter=rect(f/Δf)*δδ(f/$f_o$)

The "double delta" function (δδ) represents a pair of delta functions. A Fourier transform is used to get the equivalent convolution filter:

Convolution Filter=sinc (Δf x)cos(2π$f_o$ x)

Some assumptions are made about the constants in terms of the sample spacing x, for this application:

Δf=$f_o$=¼$x_s$=half the Nyquist frequency

Then,

Convolution Filter=sinc(x/4$x_s$)cos(2πx/4$x_s$)

This function is now evaluated at multiples of the pixel spacing in order to get a FIR filter:

TABLE I

| x | FIR |
|---|---|
| 0 | 1 |
| ±$x_s$ | 0 |
| ±2$x_s$ | −0.63 |
| ±$x_s$ | 0 |
| ±4$x_s$ | 0 |

There exist two additional requirements for the implementation of a FIR filter. The first is that all values be multiples of ½. This allows for the multiplications to be done as simple shifts of binary numbers. This can be achieved by rounding 0.63 to 0.5 and multiplying everything by 2:

0 −1 0 2 0 −1 0

Note that the rounding operation also forced the detail filter to satisfy the other requirement, namely that the filter be zero (0) mean (without a DC response). The filter of the invention looks very similar to the usual high-spatial frequency detail filter except that this filter operates on every other pixel instead of every pixel. This FIR filter design can directly replace the original horizontal detail filter that is currently available since all other operations should remain the same. All that is required is a few additional pixel delays or taps in a one dimensional delay line.

This FIR filter is particularly well adapted for the field sequencing green checkerboard CFAs since some of the images exhibit an every-other-pixel patterning. The filter of the invention would therefore not amplify this artifact since it would sample all high-valued pixels or all low-valued pixels.

Figure 3:
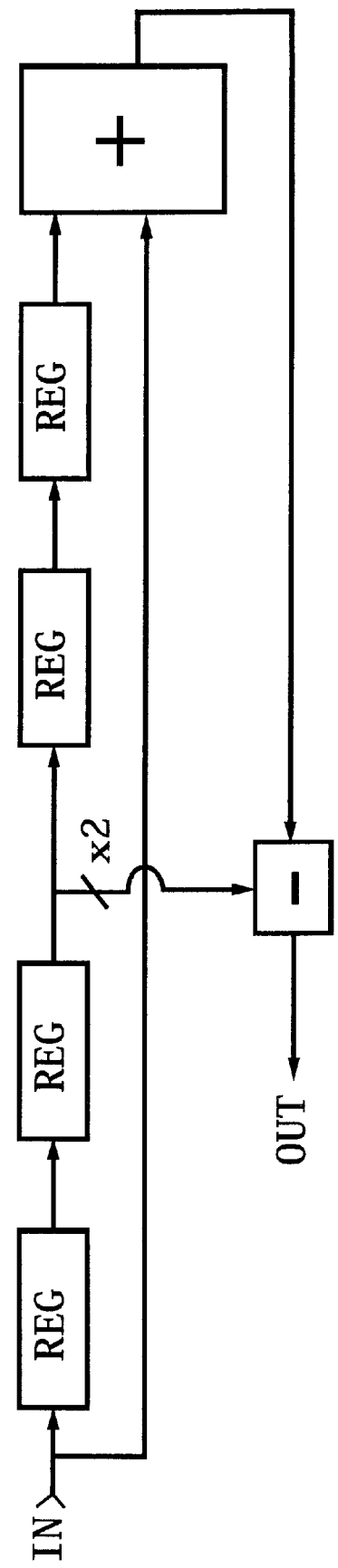
FIG. 3 is the preferred FIR filter implementation of the digital filter block shown in FIG. 1.

An example of such digital filter 14 is shown in FIG. 3, where "REG" denotes registers providing the delay by one pixel, and where "/x2" denotes binary multiplication by two.

The conventional high-frequency detail filter can be derived using the same methods, as described above, by assuming $f_o$=Δf=1/(2$x_s$)=Nyquist frequency.

To convert either of these filters to two-dimensional filters, the following FIR filter is applied to three (3) consecutive lines of one field of the video signal in order to provide a vertical detail signal at the central pixel. Some horizontal averaging is added to prevent double enhancement of diagonal edges by both the H and V filters:

TABLE II

| −⅛ | −¼ | −⅛ |
|---|---|---|
| ¼ | ½ | ¼ |
| −⅛ | −¼ | −⅛ |

This filter also has a zero DC response. The result from this vertical filter is then added to the horizontal detail signal at each pixel to obtain a two-dimensional detail signal. The relative amounts of horizontal and vertical detail signals can also be varied. Since only every other line in the frame is available to compute the vertical detail signal, the same vertical filter should be used for either the mid- or high-spatial boost filters.

A modification of this vertical detail FIR filter that may be more appropriate for the mid-spatial frequency boost filter calculates the horizontal averaging from every other pixel (as with the horizontal detail signal):

TABLE III

| −⅛ | 0 | −¼ | 0 | −⅛ |
|---|---|---|---|---|
| ¼ | 0 | ½ | 0 | ¼ |
| −⅛ | 0 | −¼ | 0 | −⅛ |

In order to prevent over-boosting or enhancement of noise, the detail signal from any of the detail filters can be run through a coring filter to remove any low amplitude detail signal that likely resulted from noise.

The foregoing is a description of the principles, preferred embodiments and modes of operation of the present invention. However, the invention should not be construed as limited to the particular embodiments discussed. Instead, the above-described embodiments should be regarded as illustrative rather than restrictive, and it should be appreciated that variations may be made in those embodiments by workers skilled in the art without departing from the scope of the present invention as defined by the following claims.

What is claimed is:

1. A finite impulse response digital filter device for processing an input signal and improving detail components of an image signal, the device being part of a signal processing network, said device comprising:
   1) digital filter means for digital filtering the input signal so as to provide a boost signal; and
   2) circuit means for adding the boost signal to the input signal so as to preferentially improve the sharpness or modulation of the mid-spatial frequencies over that of the lower and higher horizontal frequencies of the image signal coming from a video sensor.

2. A finite impulse response digital filter device according to claim 1, in combination with a video system comprising pixel delays, said filter device further comprising additional pixel delays.

3. A finite impulse response digital filter device according to claim 2, wherein the filter means operates on alternating columns of pixels to provide a device which is a two-dimensional filter.

4. A finite pulse response digital filter device according to claim 1, comprising means for horizontal averaging to prevent double enhancement of diagonal edges.

5. A finite impulse response digital filter device according to claim 1, further comprising a coring filter to remove low amplitude detail signals.

6. A finite impulse response digital filter device for processing an input signal and improving detail components of an image signal, the device being part of a signal processing network, said device comprising:

1) digital filter means for digital filtering the input signal so as to provide a boost signal; and
2) circuit means for adding the boost signal to the input signal so as to preferentially improve the sharpness or modulation of the mid-spatial frequencies over that of the lower and higher horizontal frequencies of the image signal coming from a video sensor, wherein the device operates on every other pixel.

7. A finite impulse response digital filter device for processing an input signal and improving detail components of an image signal, the device being part of a signal processing network, said device comprising:

1) digital filter means for digital filtering the input signal so as to provide a boost signal, said filter means operating on alternating columns of pixels to provide a device which is a two-dimensional filter; and
2) circuit means for adding the boost signal to the input signal so as to improve the sharpness or modulation of the mid-spatial frequencies of the image signal coming from a video sensor.

8. A finite impulse response digital filter device for processing an input signal and improving detail components of an image signal, the device being part of a signal processing network, said device comprising:

1) digital filter means for digital filtering the input signal so as to provide a boost signal;
2) means for horizontal averaging to prevent double enhancement of diagonal edges; and
3) circuit means for adding the boost signal to the input signal so as to improve the sharpness or modulation of the mid-spatial frequencies of the image signal coming from a video sensor.

9. A finite impulse response digital filter device for processing an input signal and improving detail components of an image signal, the device being part of a signal processing network, said device comprising:

1) digital filter means for digital filtering the input signal so as to provide a boost signal;
2) a coring filter to remove low amplitude detail signals; and
3) circuit means for adding the boost signal to the input signal so as to improve the sharpness or modulation of the mid-spatial frequencies of the image signal coming from a video sensor.

* * * * *